(12) United States Patent
Choi et al.

(10) Patent No.: US 11,761,914 B2
(45) Date of Patent: Sep. 19, 2023

(54) METHOD AND A DEVICE FOR MEASURING A GLASS TRANSITION TEMPERATURE AND A DEGREE OF CRYSTALLINITY OF A POLYMER

(71) Applicant: KOREA ADVANCED INSTITUTE OF SCIENCE AND TECHNOLOGY, Daejeon (KR)

(72) Inventors: Siyoung Choi, Daejeon (KR); Jinwon Park, Daejeon (KR); Jaehong Lee, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 424 days.

(21) Appl. No.: 16/986,410

(22) Filed: Aug. 6, 2020

(65) Prior Publication Data
US 2021/0041380 A1 Feb. 11, 2021

(30) Foreign Application Priority Data

Aug. 6, 2019 (KR) .................. 10-2019-0095661
Aug. 6, 2020 (KR) .................. 10-2020-0098620

(51) Int. Cl.
*G01N 25/02* (2006.01)
*G01N 25/04* (2006.01)

(52) U.S. Cl.
CPC .................. *G01N 25/04* (2013.01)

(58) Field of Classification Search
CPC combination set(s) only.
See application file for complete search history.

(56) References Cited

U.S. PATENT DOCUMENTS

| | | | |
|---|---|---|---|
| 6,425,686 B1 | 7/2002 | Zaldivar et al. | |
| 6,543,931 B2 | 4/2003 | Sauvant et al. | |
| 8,858,070 B2 | 10/2014 | Zaldivar et al. | |
| 9,702,837 B2 | 7/2017 | Al-Enezi | |
| 2002/0196834 A1* | 12/2002 | Zaldivar | G01N 25/04 374/22 |
| 2016/0153921 A1* | 6/2016 | Al-Enezi | G01N 33/44 374/22 |

FOREIGN PATENT DOCUMENTS

| | | |
|---|---|---|
| JP | S58-054696 | 12/1983 |
| JP | 3-148046 | 6/1991 |
| JP | H08-027226 | 3/1996 |
| JP | 2005-114490 | 4/2005 |
| JP | 2006329954 | 12/2006 |

(Continued)

OTHER PUBLICATIONS

Translation of KR-2019940002735 (Year: 1999).*

(Continued)

*Primary Examiner* — Lisa M Caputo
*Assistant Examiner* — Nasir U. Ahmed
(74) *Attorney, Agent, or Firm* — LEX IP MEISTER, PLLC (57) ABSTRACT

Provided are a method of and a device for measuring a glass transition temperature and a degree of crystallinity of a polymer. According to the measurement method and the device of one exemplary embodiment of the present invention, a glass transition temperature and a degree of crystallinity may be measured easily, rapidly, and accurately in a field other than a laboratory, and fast and accurate conversion is possible for various measurement conditions such as temperature, frequency, etc.

20 Claims, 6 Drawing Sheets

(56) References Cited

FOREIGN PATENT DOCUMENTS

| KR | 20-0140331 | 4/1999 |
|----|------------|--------|
| KR | 10-0342583 | 10/2002 |
| KR | 10-1185169 | 9/2012 |

OTHER PUBLICATIONS

Rongzhi Li, "Time-temperature superposition method for glass transition temperature of plastic materials", Materials Science and Engineering A278 (2000) 36-45, Feb. 15, 2000.
Rami M. Saeed et al., "Uncertainty of Thermal Characterization of Phase Change Material by Differential Scanning Calorimetry Analysis", IJERT 2016, 5 (1), 405-412.
Juan De Vicente, Rheology. InTech 2012. (Preface only).
Robert J. Young and Peter A. Lovell, Introduction to polymers (3rd ed.), CRC Press, 2011. (Preface only).
Renxuan Xie et al., "Glass Transition Temperature of Conjugated Polymers by Oscillatory Shear Rheometry", Macromolecules 2017, 5146-5154. DOI: 10.1021/acs.macromol.7b00712.
K. Fukushima et al., "Determination of Time-Temperature Shift Factor for Long-Term Life Prediction of Polymer Composites", ICCM-17, 2009.
Xiaobo Shen et al., "Measuring the Degree of Crystallinity in Semicrystalline Regioregular Poly(3-hexylthiophene", Macromolecules, Jun. 14, 2016, 49, 4501-4509. DOI: 10.1021/acs.macromol.6b00799.
Mettler Toledo, Thermal Analysis of Polymers, Selected Applications, 2013.

* cited by examiner

METHOD AND A DEVICE FOR MEASURING A GLASS TRANSITION TEMPERATURE AND A DEGREE OF CRYSTALLINITY OF A POLYMER

TECHNICAL FIELD

The present invention relates to a method of and a device for measuring a glass transition temperature and a degree of crystallinity of a polymer.

BACKGROUND ARTS

Polymeric materials often have an intrinsic property called glass transition temperature. Glass transition temperature refers to a temperature at which heat energy is supplied enough to allow a segment to have fluidity, the segment in which respective repeating units constituting a polymeric material are connected.

A general polymeric material exhibits a rigid glass-like behavior at a temperature below its glass transition temperature, and exhibits a rubbery behavior or a viscous fluid at a temperature above its glass transition temperature.

In general, other compounds or substances than polymer resins form a regular arrangement at low temperatures to form a stacked crystalline solid phase, whereas polymer resins often includes both a crystalline region and an amorphous region that is difficult to form crystals.

When heat is applied to such a polymeric material, the amorphous region is activated and micro-Brownian motion occurs, and as a result, the behavior changes. The representative temperature of this transition region is regarded as the glass transition temperature.

As described, since a very significant change in the behavior of polymeric materials takes place at the glass transition temperature, it is necessary to rapidly and accurately measure the glass transition temperature in order to process the polymeric materials or to predict thermal stability for their application to specific products.

Usually, the glass transition temperature has been measured mainly using a differential scanning calorimetry (DSC), dynamic mechanical analysis (DMA), or an atomic force microscope (AFM).

Differential scanning calorimetry focuses on a rapid endothermic or exothermic phenomenon as morphology of polymeric materials changes before and after the glass transition temperature. In the differential scanning calorimetry, the difference in the amount of heat required to equally increase or decrease the temperature of a target polymer specimen is measured, from which the heat flow applied to the polymer specimen is calculated. The temperature in the section where the heat flow rapidly changes is interpreted as the section in which the glass transition occurs, which is determined as the glass transition temperature.

In the case of dynamic mechanical analysis, modulus values are measured under periodic stress-strain conditions within a linear range, and in general, a temperature at a point where a tangent delta (tan D), which is a ratio of loss modulus to storage modulus, has a local maximum value, or a point where loss modulus has a local maximum value, is determined as the glass transition temperature.

In the case of atomic force microscope, the surface of the specimen is observed by using a probe of a cantilever structure, and changes in the storage modulus according to the insertion speed of the probe is examined. The glass transition temperature is determined from the temperature at a point where the jump on phase curve occurs during heating or cooling.

However, in the above measurement methods, it is necessary to manufacture a specific specimen that fits a specimen holder or the like, in order to be mounted on the measuring device, and it is impossible to perform direct in-situ measurement.

In addition, the above measurement methods have a problem in that a sample of about 10 mg or 100 mg or more is required. DMA has a problem in that, since a sample cannot maintain its shape above the glass transition temperature, measurement is difficult. AFM has a problem in that it is difficult to obtain surface information from the probe below the glass transition temperature (glass state).

DISCLOSURE

Technical Problem

There is provided a novel method capable of measuring a glass transition temperature easily, rapidly, and accurately in a field other than a laboratory.

Further, there is provided a novel method capable of measuring a degree of crystallinity of a polymeric material easily, rapidly, and accurately in a field other than a laboratory.

Further, there is provided a novel device capable of measuring a glass transition temperature and a degree of crystallinity easily, rapidly, and accurately in a field other than a laboratory.

Technical Solution

According to an aspect of the present invention, there is provided a method of measuring a glass transition temperature of a polymer, the method including the steps of A) (a1) colliding a collision sphere with a polymer specimen by dropping the collision sphere onto the polymer specimen from a predetermined drop height ($H_0$); (a2) measuring a maximum bounce height ($H_1$) of the collision sphere bounced by a resilience after colliding with the polymer specimen, and calculating a ratio (H ratio, $H_1/H_0$) of the maximum bounce height to the drop height; B) measuring the H ratio according to each temperature by repeating the steps of a1 and a2 while varying the temperature; and C) estimating the glass transition temperature from the measured H ratio according to each temperature.

In this regard, the step of estimating the glass transition temperature includes the step of (c1) examining a temperature (T) at a point where the H ratio has a local minimum value, thereby estimating the temperature (T) as the glass transition temperature.

According to one exemplary embodiment of the present invention, the method of measuring a glass transition temperature of a polymer may further include the step of (c2) correcting the T value obtained in (c1).

In c2, the glass transition temperature value may be obtained by correcting the measurement temperature T value by a method such as parallel movement by a parallel movement model according to the time-temperature superposition principle.

Specifically, the step of (c2) correcting may include the steps of calculating a collision time (s, second) between the collision sphere and the polymer specimen in the step of a1; calculating a collision frequency ($f_1$, Hz) from the collision time (s); and calculating a correction factor value ($C_f$) by substituting a frequency (f₀, Hz) in a standard method of measuring a glass transition temperature and the above collision frequency (f₁) into the following Equation 1:

$$C_f = \log \frac{f_0}{f_1} \quad \text{[Equation 1]}$$

in Equation 1, $C_f$ represents a correction factor value, $f_0$ represents a frequency (Hz) used in a standard method of measuring a glass transition temperature of a polymer, and $f_1$ represents a collision frequency (Hz) obtained from a collision time (s, second) between a collision sphere and a polymer specimen.

The correction factor thus obtained is substituted into the following Equation 2 to obtain a glass transition temperature value, i.e., the same glass transition temperature value as measured by the existing standard measurement method.

$$T_0 = T + \frac{C_2 C_f}{C_1 + C_f} \quad \text{[Equation 2]}$$

in Equation 2, $T_0$ represents a glass transition temperature value of a target polymer resin, T represents a temperature at a point where the H ratio has a local minimum value, $C_f$ represents the correction factor value obtained by Equation 1, and $C_1$ and $C_2$ represent each constant value determined according to the type of the polymer resin, respectively.

According to another exemplary embodiment of the present invention, the step of estimating the glass transition temperature may further include the steps of (c3) obtaining a temperature-H ratio curve from the measurement value; and (c4) examining a temperature at which the H ratio value starts to most rapidly decrease on the temperature-H ratio curve, thereby estimating the temperature as the glass transition temperature.

In this regard, the step of c4 may include the steps of calculating an instantaneous rate of change (a first rate of change) of the H ratio according to temperature; calculating an instantaneous rate of change (a second rate of change) of the instantaneous rate of change of the H ratio according to temperature; and examining a temperature at which the second rate of change has a minimum value on the temperature-H ratio curve, thereby estimating the temperature as the glass transition temperature.

According to still another exemplary embodiment of the present invention, the step of c4 may include the steps of calculating an instantaneous rate of change (a first rate of change) of the H ratio according to temperature; calculating an instantaneous rate of change (a second rate of change) of the instantaneous rate of change of the H ratio according to temperature; obtaining a tangent line (a first tangent line) in a first temperature range in which the first rate of change is smaller than 0 and the second rate of change is 0 on the temperature-H ratio curve; obtaining a tangent line (a second tangent line) in a second temperature range in which the first rate of change is smaller than 0 and the second rate of change is 0 on the temperature-H ratio curve; and estimating, as the glass transition temperature, a temperature at the intersection of the first tangent line and the second tangent line.

In the method of measuring a glass transition temperature of a polymer according to still another exemplary embodiment of the present invention, the polymer specimen for measurement may be preferably in the form of a sheet.

Further, the polymer specimen may preferably have a thickness of about 10 nm or more.

Further, the polymer specimen may preferably have a density of about 0.01 g/cm³ to about 2 g/cm³.

Further, the polymer specimen may be used as a measurement object without particular limitation, as long as it is made of a polymer having a glass transition temperature. Specifically, the polymer specimen may include, for example, one or more polymer resins selected from the group consisting of polyolefin-based, polyamide-based, polystyrene-based, polyvinyl-based, polylactide-based, silicone rubber-based, polycarbonate-based, polyacrylonitrile-based, polyacrylic-based, cellulose-based, polyester-based, polyimide-based, polyacetal-based, fluorine-based, polysulfone-based, and polyketone-based polymers, and copolymers thereof.

According to one exemplary embodiment of the present invention, the collision sphere may preferably have a diameter of 0.1 mm to 50 mm.

In this regard, the collision sphere may have a coefficient of restitution of about 0.4 to about 1, and specifically, its lower limit may be about 0.4 or more, or about 0.5 or more, or about 0.7 or more, and its upper limit may be about 1 or less, or less than about 1, or about 0.95.

Meanwhile, according to another aspect of the present invention, there is a provided a device for measuring a glass transition temperature and a degree of crystallinity of a polymer, the device including a dropping part 100 for dropping a collision sphere; a collision part 200 for generating a collision between the collision sphere and a polymer specimen; and a height-measuring part 300 for measuring a drop height (H₀) of the collision sphere and a maximum bounce height (H₁) of the collision sphere bounced by a resilience after colliding with the polymer specimen.

According to one exemplary embodiment of the present invention, the device for measuring physical properties of a polymer may preferably further include a temperature controller 400 for controlling the temperature of the target polymer specimen.

According to another exemplary embodiment of the present invention, the device for measuring physical properties of a polymer may further include a collision time-measuring part for measuring the collision time of the collision sphere and the polymer specimen.

Meanwhile, according to still another aspect of the present invention, there is a provided a method of measuring a degree of crystallinity of a polymer, the method including the steps of A) (a1) colliding a collision sphere with a polymer specimen by dropping the collision sphere onto the polymer specimen from a predetermined drop height (H₀); (a2) measuring a maximum bounce height (H₁) of the collision sphere bounced by a resilience after colliding with the polymer specimen, and calculating a ratio (H ratio, H₁/H₀) of the maximum bounce height to the drop height; B) measuring the H ratio according to each temperature by repeating the steps of a1 and a2 while varying the temperature; and C) examining a local minimum value from the H ratio measurement value according to each temperature.

The terms used herein are just for explaining exemplary embodiments and it is not intended to restrict the present invention.

The singular expression may include the plural expression unless it is differently expressed contextually.

It must be understood that the term "include", "equip", or "have" in the present description is only used for designating characteristics taken effect, numbers, steps, components, or combinations thereof, and do not exclude the possibility of addition of one or more different characteristics, numbers, steps, components or combinations thereof.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Meanwhile, according to one exemplary embodiment of the present invention, an analysis method of using H ratio values according to temperature changes is used. In this regard, changes in the H ratio according to the temperature change may be visualized and analyzed by direct visual examination, or confirmed and analyzed by a fitting method of using a computer program. The computer program used at this time may be a commercial program such as Excel, Origin, Matlab, Mathematica, Igor Pro, etc.

Hereinafter, the present invention will be described in detail.

According to one aspect of the present invention, provided is a method of measuring a glass transition temperature of a polymer, the method including the steps of A) (a1) colliding a collision sphere with a polymer specimen by dropping the collision sphere onto the polymer specimen from a predetermined drop height ($H_0$); (a2) measuring a maximum bounce height ($H_1$) of the collision sphere bounced by a resilience after colliding with the polymer specimen, and calculating a ratio (H ratio, $H_1/H_0$) of the maximum bounce height to the drop height; B) measuring the H ratio according to each temperature by repeating the steps of a1 and a2 while varying the temperature; and C) estimating the glass transition temperature from the H ratio measurement value according to each temperature.

Throughout the specification, the local minimum value refers to one of the lowest points in a graph of the H ratio value vs the temperature change obtained by the above series of processes, and among them, the local minimum value refers to a point where the minimum value is within the measurement temperature range.

Further, in the analysis of the H ratio value, the measurement value may be used as it is, but for convenience, it may be used after being normalized, based on the maximum value of the measured H ratio. Specifically, in this case, after measuring the H ratio value according to each temperature, it is necessary to select the H ratio value to be a reference. Here, the 'maximum value of the measured H ratio' refers to the H ratio value in the section where the H ratio value does not change within the temperature change of 20° C. in a low temperature region, specifically, below the glass transition temperature. In terms of the polymer, it means that no change occurs in the internal structure of the polymer resin even though the temperature changes in the corresponding temperature range, and at this time, the H ratio value is the maximum H ratio value of the corresponding polymer resin.

As described above, general polymeric materials rapidly change in terms of rheological properties such as viscosity, elasticity, etc., before and after the glass transition temperature. The present inventors have focused on this point, and found, through repeated collision experiments, that a temperature at which elasticity of a polymer is extremely changed is derived, and this temperature may correspond to a glass transition temperature of the corresponding polymer, thereby completing the present invention.

(Below Glass Transition Temperature)

Below a glass transition temperature of a target polymer specimen, the target polymer behaves like a hard glass, and when it collides with another object, the coefficient of restitution is high. Therefore, when the maximum bounce height of an external object, that is, the collision sphere of the present invention is measured after colliding with the polymer specimen below the glass transition temperature, a relatively high value is obtained.

(Near Glass Transition Temperature)

Meanwhile, as the temperature of the polymer specimen increases to be closer to the glass transition temperature, fluidity of segments constituting the polymer increases, and when colliding with another object, each segment inside the polymer is able to disperse an impact caused by the collision, and thus the coefficient of restitution becomes lower. In particular, under temperature conditions at which the glass transition begins to appear, a polymer segment having a small molecular weight in the polymer specimen first starts segmental motion, and therefore, a change of the internal structure (conformational change) may occur due to impact or energy transmitted from the outside. However, under this temperature condition, the distance between polymer segments is still close, and respective segments or chains are entangled, which hinders the conformational change, and the motion or the change of the internal structure hardly occur in polymer segments with a high molecular weight.

Therefore, energy transferred by the external impact is mostly lost as friction between chains or thermal energy, and a delayed conformational change occurs with respect to external energy. In other words, when the maximum bounce height of an external object, that is, the collision sphere of the present invention after colliding with the polymer specimen under such a condition is measured, a relatively low value is obtained.

On the other hand, in the case of a semi-crystalline polymer, segmental motion may occur in the amorphous part in this temperature range, but the crystalline part still maintains elasticity in a solid-like state because the internal structure does not change.

In this regard, the amorphous part is involved in dissipating the energy transmitted from the sphere, and the crystalline part is involved in transferring the energy back to the sphere. Theoretically, in the case of a completely amorphous polymer, the coefficient of restitution is almost 0 around the glass transition temperature because the sphere hardly bounces, and in the case of a semi-crystalline polymer, the coefficient of restitution has a value greater than 0 by elasticity due to the crystalline part around the glass transition temperature.

(Over Glass Transition Temperature)

Meanwhile, when the temperature continues to rise over the glass transition temperature, the kinetic energy of each polymer segment increases and the total volume of the polymer continues to increase on average after the glass transition of the polymer occurs, and thus the distance between the polymer segments also becomes sufficient and the structure of each entangled segment also gradually loosens. Therefore, the impact or energy transmitted from the outside is hardly lost by friction between segments or chains, and an immediate conformal change occurs with respect to the external force. In other words, when an external object, that is, the collision sphere of the present invention collides with the polymer specimen under these conditions, an immediate structural change occurs inside the polymer resin specimen, and a restoring force of the polymer specimen immediately exerts, and thus the collision sphere bounces higher near glass transition temperature.

In the case of a semi-crystalline polymer in this temperature range, the crystalline part still maintains elasticity in the same state as a solid because there is no substantial change in the internal structure, and substantially, continues to exhibit properties as a solid in the range before the temperature at which crystals melt.

Therefore, when the collision test of the target polymer specimen is repeated under each temperature condition to find a point where the target polymer specimen has the lowest coefficient of restitution, the temperature at the point may be regarded as the glass transition temperature of the target polymer specimen.

According to the above principle, the step C) may include the step of (c1) examining a temperature (T) at the point where the H ratio has the local minimum value, thereby estimating the temperature (T) as the glass transition temperature.

Figure 1:
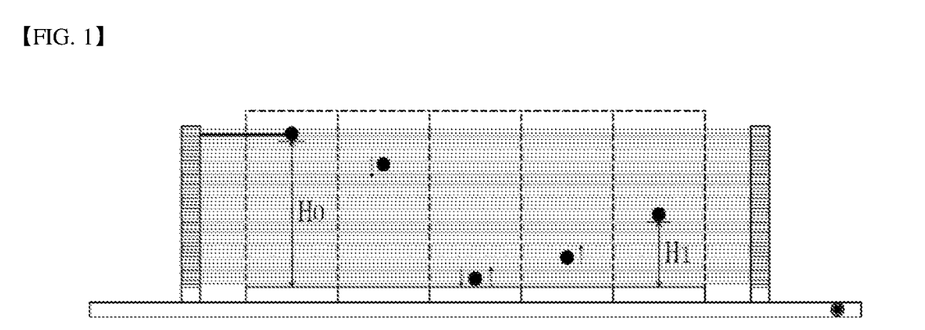
FIG. 1 shows a schematic illustration of a method of measuring physical properties of a polymer according to an exemplary embodiment of the present invention over time.

FIG. 1 shows a schematic illustration of a method of measuring a glass transition temperature of a polymer according to an exemplary embodiment of the present invention over time.

Referring to FIG. 1, the steps of A) (a1) colliding a collision sphere with a polymer specimen by dropping the collision sphere onto the polymer specimen from a predetermined drop height ($H_0$); (a2) measuring a maximum bounce height ($H_1$) of the collision sphere bounced by a resilience after colliding with the polymer specimen may be performed.

Figure 3:
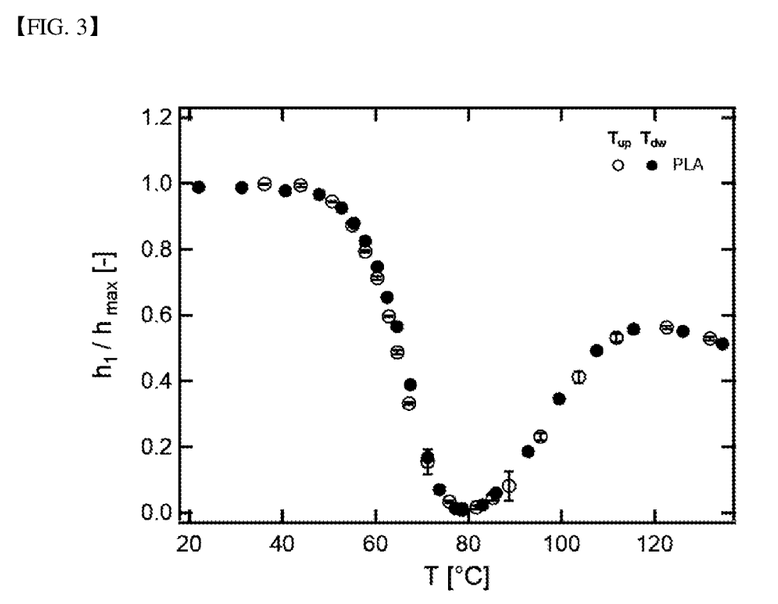
FIGS. 3 to 10 show a graph summarizing the measurement results according to the method of measuring physical properties of a polymer according to an exemplary embodiment of the present invention.

FIG. 3 shows a graph summarizing the measurement results according to a method of measuring a glass transition temperature of a polymer according to an exemplary embodiment of the present invention.

Specifically, in FIG. 3, H ratio values were measured according to temperature changes, and the H ratio value in the section where the H ratio value does not change within the temperature change of 20° C., specifically near about 20° C. was regarded as 1, and the H ratio value according to each temperature was normalized.

Referring to FIG. 3, a temperature (T) at the point where the coefficient of restitution of the target polymer specimen is the lowest, that is, the H ratio has a local minimum value may be clearly identified.

According to one exemplary embodiment of the present invention, the method of measuring a glass transition temperature of a polymer may further include the step (c2) of correcting the T value obtained in (c1) according to the measurement conditions.

In the case of DSC which is known as a method of measuring a glass transition temperature of a polymer, there is no particular measurement frequency. DMA is designed to measure a value in the frequency (or response time or rate) region in which the corresponding polymer is actually utilized, and for example, it is common to perform measurement after setting the temperature range, heating rate, frequency, amplitude, etc.

A measurement frequency range in the DMA device is generally about 0 Hz to about 200 Hz, or about 1 Hz to about 150 Hz.

In the method of measuring a glass transition temperature according to an exemplary embodiment of the present invention, the measurement frequency range as described above may correspond to the collision time of the polymer specimen and the collision sphere.

Specifically, in the method of measuring a glass transition temperature according to an exemplary embodiment of the present invention, when the collision time (s, second) of the polymer specimen and the collision sphere is measured, and the reciprocal thereof is obtained ($s^{-1}$, Hz), this may directly correspond to a measurement frequency range in a different measurement method.

Therefore, when the frequency range in which the glass transition temperature value is to be measured corresponds to the collision time of the present invention, the temperature at the point where the target polymer specimen has the lowest coefficient of restitution in the collision test may be determined as the glass transition temperature of the target polymer specimen without additional correction.

Further, in the present invention, the collision time may be controlled by a method of varying the material of the collision sphere used in the collision test or the drop height, which may correspond to varying the measurement frequency in the existing method.

According to this method, it is possible to find out the glass transition temperature values at various measurement frequencies.

However, for certain reasons, if there is a restriction on the control of the collision time and thus correction of the measurement temperature value is needed, the glass transition temperature value may be obtained by correcting the measurement temperature T value by a method such as parallel movement by a parallel movement model according to the time-temperature superposition principle (TTS).

In measuring physical properties of a polymer having a simple structure, such as an amorphous polymer, effects of time and temperature may be explained by a well-known theory called TTS.

The TTS theory is a theory applied to measurement of rheological properties, and it is a theory that explains inverse action of temperature and time along the same line in a polymer.

In the present invention, the TTS theory may be applied as follows: Physical properties of a material having viscoelasticity are greatly affected by temperature or frequency during measurement. For example, when a specific conformal change occurs in a4) the polymer by a3) any external force transmitted for a predetermined period of time a2) from the outside a1) under specific conditions, in order to b2) transmit the same external force as a2 to b1) a polymer under different conditions and to b4) cause the same deformation as a4, b2) the external force of b2) must be transmitted for a time different from that of a2. This difference may be quantitatively calculated using the TTS theory.

According to such a TTS theory, it was found that, in the case of measuring specific properties that vary depending on the temperature while changing the temperature in a predetermined frequency range, a curve obtained therefrom may be superposed on another curve by parallel movement with respect to the frequency axis. A single superposed curve created by such parallel movement is called a master curve, and in this regard, a variable representing the degree of parallel movement of each curve according to temperature is called a correction factor (shift factor).

Therefore, with respect to the target polymeric material, a reference temperature is determined in a measurable region (measurable frequency region). By obtaining a shift factor for each temperature with respect to the reference, and then performing parallel movement with respect to the axis, it is possible to estimate values of physical properties in a very wide range of frequencies that are difficult to measure.

Specifically, the step c2 of correcting may include the steps of calculating a collision time (s, second) between the collision sphere and the polymer specimen in the step a1;

calculating a collision frequency ($f_1$, Hz) from the collision time (s); and calculating a correction factor value ($C_f$) by substituting a frequency ($f_0$, Hz) in a standard method of measuring a glass transition temperature and the above collision frequency ($f_1$) into the following Equation 1:

$$C_f = \log \frac{f_0}{f_1} \qquad \text{[Equation 1]}$$

in Equation 1, $C_f$ represents a correction factor value, $f_0$ represents a frequency (Hz) used in a standard method of measuring a glass transition temperature of a polymer, and $f_1$ represents a collision frequency (Hz) obtained from a collision time (s, second) between a collision sphere and a polymer specimen.

In other words, the correction factor $C_f$ is calculated by taking a common logarithm of a ratio of $f_0$ to $f_1$, wherein $f_0$ is the frequency value used at the time of measuring the glass transition temperature to be converted, and $f_1$ is the frequency value obtained from the collision time by the measurement method according to an exemplary embodiment of the present invention.

The correction factor thus obtained is substituted into the following Equation 2 to calculate a glass transition temperature value, i.e., the same glass transition temperature value as measured in the different frequency range.

$$T_0 = T + \frac{C_2 C_f}{C_1 + C_f} \qquad \text{[Equation 2]}$$

in Equation 2, $T_0$ represents a glass transition temperature value of a polymer resin to be obtained, T represents a temperature at a point where the H ratio has a local minimum value, $C_f$ represents the correction factor value obtained by Equation 1, and $C_1$ and $C_2$ represent each constant value determined according to the type of the polymer resin, respectively.

Here, $C_f$ is given by the measurement frequency value and the frequency value to be converted, T is a value given by measurement, and unknown variables in Equation 2 are three including $T_0$ which is the glass transition temperature value to be converted, and constants $C_1$ and $C_2$.

Therefore, when the measurement is repeated only three or more times, it is possible to know all the values of $T_0$ and constants $C_1$ and $C_2$ by a substitution/elimination method. In the present invention, therefore, the values of $C_1$ and $C_2$ in Equation 2 are not limited to a specific value.

Meanwhile, Equations 1 and 2 are derived from the following Williams Landel Ferry model (WLF model) equation, which is one of the models for explaining the TTS theory, and thus the present invention is not limited to the models of Equations 1 and 2. Any other model equations for correcting the measurement value by parallel movement using the TTS theory may also be used in the present invention, and as previously described, the correction may not be needed by controlling the measurement frequency.

$$\log a_T = -\frac{C_1(T-T_0)}{C_2+(T-T_0)} \quad a_{T,PLA} = \frac{f_{reference\,T}}{f_{shifted\,T}}$$

In the WLF model equation, the log $a_T$ value may be understood as a concept of corresponding to the $C_f$ value of Equation 1 of the present invention, and the above two equations are combined and summarized for $T_0$ to obtain Equation 2 of the present invention.

Therefore, by using the WLF model equation, it is possible to easily convert the glass transition temperature value of the polymer measured according to an exemplary embodiment of the present invention into the glass transition temperature value of the polymer measured in another desired frequency range.

Meanwhile, in the case of the WLF model equation, it has been found that $C_1=17.44$, $C_2=51.6$ are satisfied for many polymeric materials when $T_0$ is generally taken as the glass transition temperature. As described above, the present invention is not limited to these constant values, but for convenience in calculation, correction for the measurement temperature may be performed using the values of $C_1$ and $C_2$ mentioned above.

According to another exemplary embodiment of the present invention, the step of estimating the glass transition temperature may further include the steps of (c3) obtaining a temperature-H ratio curve from the measurement value; and (c4) examining a temperature at which the H ratio value starts to most rapidly decrease on the temperature-H ratio curve, thereby estimating the temperature as the glass transition temperature.

The degree of decrease of the H ratio value on the temperature-H ratio curve may be confirmed by a slope value of the temperature-H ratio curve, i.e., an instantaneous rate of change (hereinafter, first rate of change) of the H ratio value with respect to temperature. In other words, when the H ratio is assumed as a function of temperature through the temperature-H ratio curve, it may be regarded as a first-order derivative of the corresponding function.

How quickly the degree of decrease of the H ratio value changes on the temperature-H ratio curve may be confirmed by the rate of change of the slope value, i.e., an instantaneous rate of change (second rate of change) of the instantaneous rate of change of the H ratio value according to temperature. In other words, when the H ratio is assumed as a function of temperature through the temperature-H ratio curve, it may be regarded as a second-order derivative of the corresponding function.

Therefore, the temperature at which the H ratio value starts to most rapidly decrease on the temperature-H ratio curve means a point where the absolute value of the second-order derivative is the largest when the H ratio is assumed as a function of temperature through the temperature-H ratio curve; and a point where the second-order derivative value has a minimum value, considering that the H ratio value continuously decreases in the temperature range over the glass transition temperature of the corresponding function.

In other words, the step of c4 may include the steps of calculating an instantaneous rate of change (first rate of change) of the H ratio value according to temperature; calculating an instantaneous rate of change (second rate of change) of the instantaneous rate of change of the H ratio value according to temperature; and examining a temperature at which the second rate of change has the minimum value on the temperature-H ratio curve, thereby estimating the temperature as the glass transition temperature, and this point may be determined as the glass transition temperature of the polymer.

As described above, in the glass transition section including the glass transition temperature, as the temperature increases, short chains of the polymer chains may gradually start segmental motion, and as the temperature continues to increase, chains with large molecular weights may also start segmental motion.

In other words, since the internal structure of the polymer resin changes from a state in which segmental motion is impossible to a state in which segmental motion is possible before and after the glass transition temperature, it is confirmed that externally measurable physical properties of the polymer resin also most rapidly change before and after the glass transition temperature.

In other words, in the glass transition temperature range, fluidity of the segments constituting the polymer increases, and a rapid change in the internal structure begins to occur, and therefore, the above method may be considered as a method to accurately approximate the starting point of such a rapid internal change by function analysis.

Figure 4:
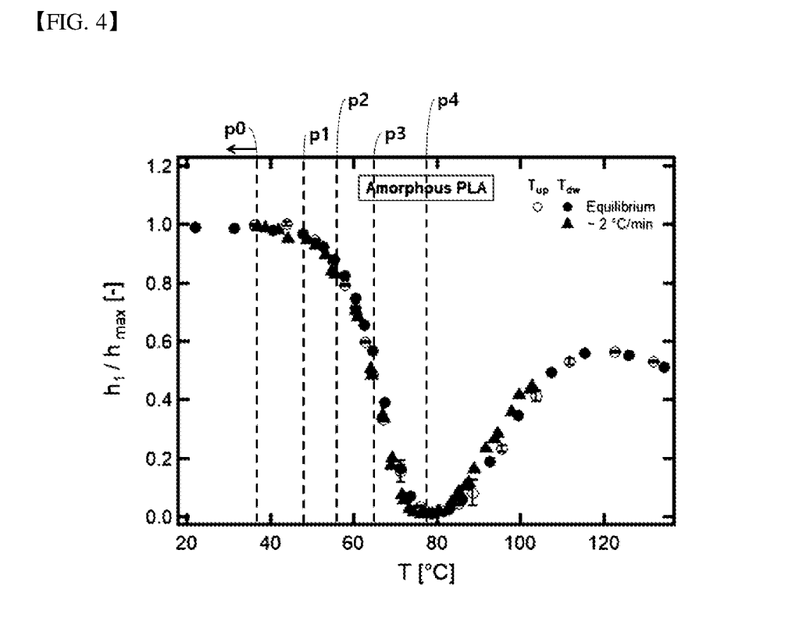
Figure 5:
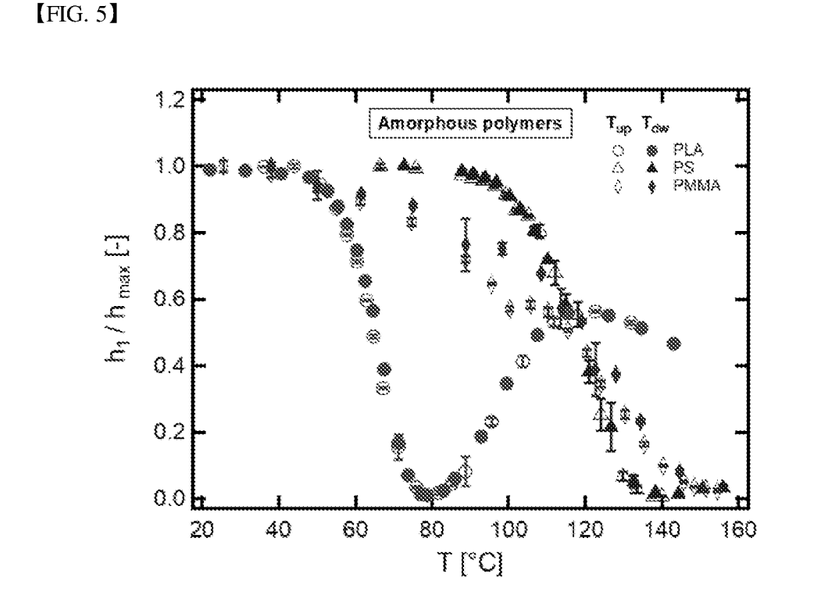
Figure 6:
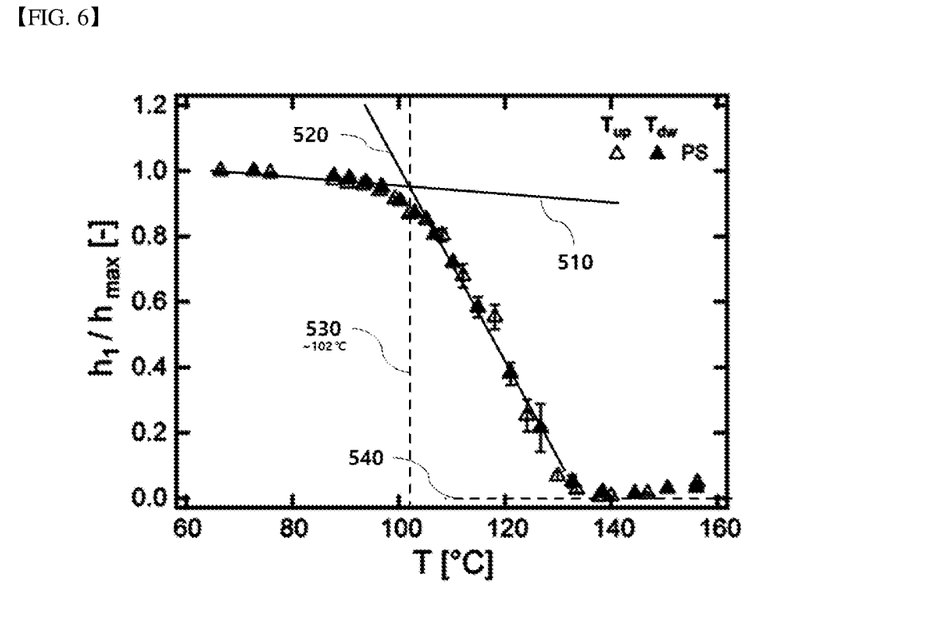
Figure 7:
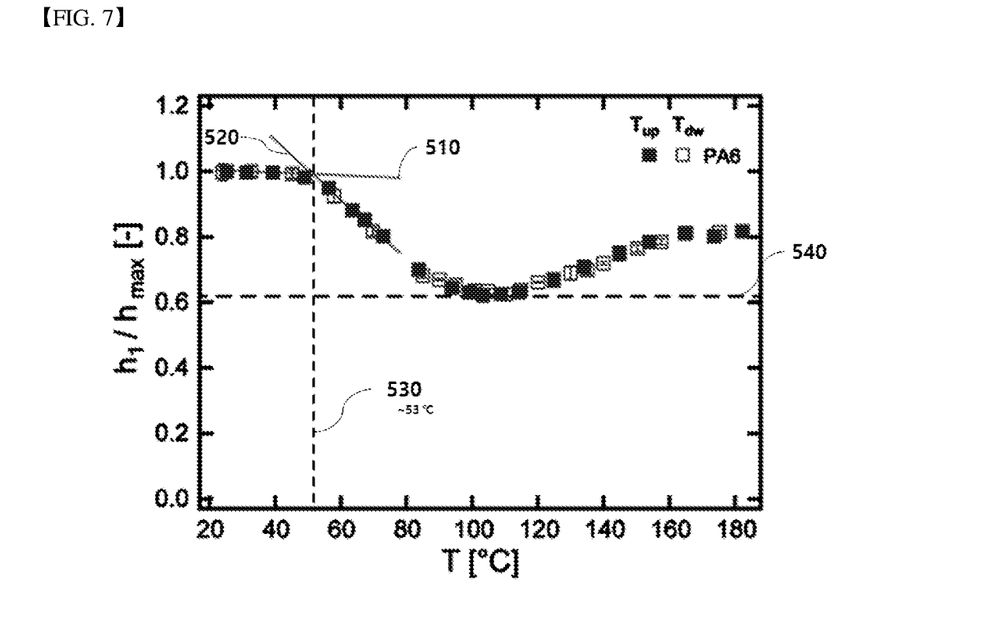
Figure 8:
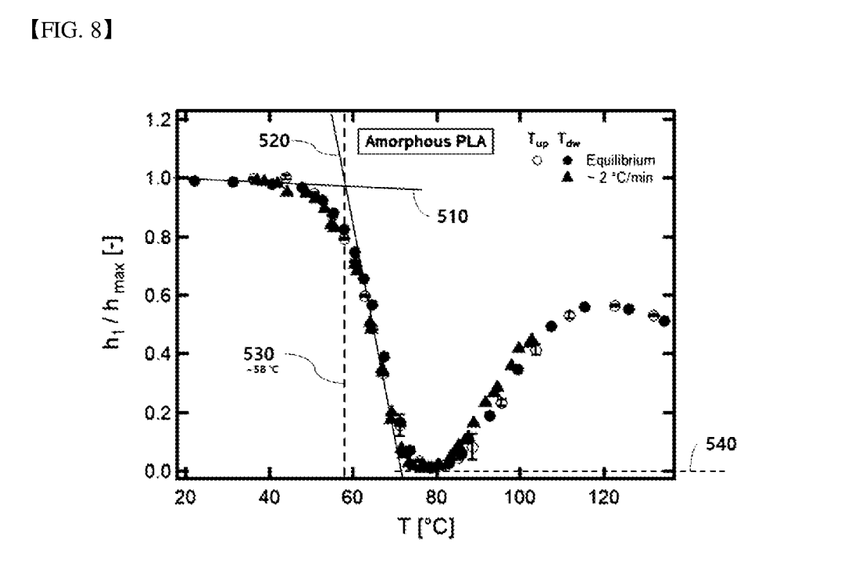
Figure 9:
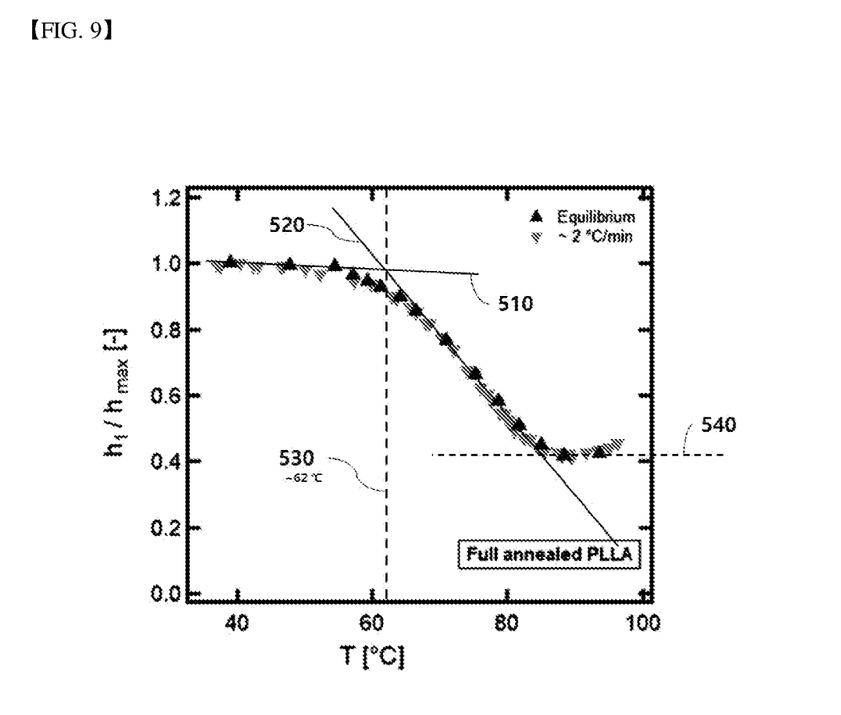

FIG. 4 shows a graph summarizing the measurement results according to a method of measuring a glass transition temperature of a polymer according to an exemplary embodiment of the present invention.

Specifically, in FIG. 4, H ratio values were measured according to temperature changes, and the H ratio value in the section where the H ratio value does not change within the temperature change of 20° C., specifically near about 20° C. was regarded as 1, and the H ratio value according to each temperature was normalized.

Referring to FIG. 4, when the H ratio is assumed as a function of temperature through the temperature-H ratio curve, the approximate form of the function may be confirmed.

In FIG. 4, the point p0 is a point where the maximum H ratio appears in the temperature-H ratio, and there is no substantial change in the H ratio value despite the temperature change. Therefore, based on this point, a normalized expression for each H ratio value is possible. At this point, the first rate of change is approximately 0 within the measurable error range.

In FIG. 4, the point p1 is a point where the temperature-H ratio curve appears as a straight downward line, and in this section, the rate of change of the H ratio value according to the temperature change, i.e., the first rate of change becomes 0 or less, and the second rate of change becomes 0. At temperatures below this point, segmental motion is generally difficult inside the above-described polymer resin. However, as the temperature decreases, hardness of the polymer increases and the coefficient of restitution tends to increase, and therefore, the first rate of change is 0 or less.

In FIG. 4, the point p2 is a point where the temperature-H ratio curve forms a convex downward curve and the H ratio value starts to rapidly decrease. In this section, the rate of change of the H ratio value according to the temperature change, i.e., the first rate of change also rapidly decreases, and at this time, the second rate of change has a minimum value. At this point, segmental motion of the shortest chains begins to occur inside the polymer resin, and each chain begins to be gradually flexible.

In FIG. 4, the point p3 is a point where the temperature-H ratio curve forms a sharp downward straight line, and the H ratio value rapidly decreases. In this section, the rate of change of the H ratio value according to the temperature change, i.e., the first rate of change is displayed as a value less than 0, and the second rate of change becomes 0. At this point, segmental motion of relatively long chains also begins to occur inside the polymer resin, and chains in all regions gradually become flexible.

In FIG. 4, the point p4 is a minimum point of the temperature-H ratio curve, and in this section, the rate of change of the H ratio value according to the temperature change, i.e., the first rate of change continues to increase passing 0, and at this time, the second rate of change has a maximum value. At this point, sufficient segmental motion occurs in almost all chains inside the polymer resin.

Referring to FIG. 4, in the step c4 of the present invention, the temperature at which the second rate of change has the minimum value on the temperature-H ratio curve may be derived as p2 through the steps of calculating an instantaneous rate of change (first rate of change) of the H ratio value according to temperature; and calculating an instantaneous rate of change (second rate of change) of the instantaneous rate of change of the H ratio value according to temperature. This point may be determined as the glass transition temperature of the polymer.

According to another embodiment of the present invention, c4 may include the steps of calculating an instantaneous rate of change (first rate of change) of an H ratio value according to temperature; calculating an instantaneous rate of change (second rate of change) of the instantaneous rate of change of the H ratio value according to temperature; obtaining a tangent line (first tangent line) in a first temperature section in which the first rate of change is less than 0 and the second rate of change is 0 on the temperature-H ratio curve; obtaining a tangent line (second tangent line) in a second temperature section in which the first rate of change is less than 0 and the second rate of change is 0 on the temperature-H ratio curve; and obtaining a temperature at the intersection of the first tangent line and the second tangent line, thereby estimating this temperature as a glass transition temperature.

The above method is also intended to accurately approximate the starting point of the rapid internal change of the polymer by function analysis.

Referring to FIG. 4, the first temperature section, in which the first rate of change is less than 0 and the second rate of change is 0, on the temperature-H ratio curve, may be regarded as a section to which p1 belongs. At point p1, as described above, since the second rate of change is 0 and a straight line is shown, the corresponding straight line may have the same shape as the first tangent line.

The second temperature section, in which the first rate of change is less than 0 and the second rate of change is 0, on the temperature-H ratio curve, may be regarded as a section to which p3 belongs. At point p3, as described above, since the second rate of change is 0 and a straight line is shown, the corresponding straight line may have the same shape as the second tangent line.

Further, through the intersection of the two tangent lines, it is possible to approximate the point where the rapid change in the polymer begins. This point may be derived as the glass transition temperature of the corresponding polymer.

FIGS. 6 to 9 show a graph summarizing the measurement results according to a method of measuring a glass transition temperature of a polymer according to an exemplary embodiment of the present invention.

For reference, in FIGS. 6 to 9, the H ratio value is measured according to the temperature change, and the H ratio value in the section (p0) in which the H ratio value does not change within the temperature change of 20° C. is regarded as 1, and the H ratio value according to each temperature is normalized. For convenience, the point p0 described above is omitted.

Referring to FIGS. 6 to 9, confirmed are a series of processes for obtaining a tangent line (first tangent line; 510) in the first temperature section in which the first rate of change is less than 0 and the second rate of change is 0 on the temperature-H ratio curve, and a tangent line (second tangent line; 520) in the second temperature section where the first rate of change is less than 0 and the second rate of change is 0 on the temperature-H ratio curve; and then obtaining a temperature at the intersection point 530 of the first tangent line and the second tangent line.

Meanwhile, according to still another aspect of the present invention, provided is a method of measuring a degree of crystallinity of a polymer, the method including the steps of A) (a1) colliding a collision sphere with a polymer specimen by dropping the collision sphere onto the polymer specimen from a predetermined drop height ($H_0$); (a2) measuring a maximum bounce height ($H_1$) of the collision sphere bounced by a resilience after colliding with the polymer specimen, and calculating a ratio (H ratio, $H_1/H_0$) of the maximum bounce height to the drop height; B) measuring the H ratio according to each temperature by repeating the steps of a1 and a2 while varying the temperature; and C) examining a local minimum value from the H ratio measurement value according to each temperature.

The principle of measuring the degree of crystallinity is the same as the above-described method of measuring the glass transition temperature. When the H ratio measurement value according to each temperature is shown, it passes the glass transition section, i.e., the minimum value. As described above, in the case of an amorphous polymer, the H ratio value at this minimum point is close to 0, and in the case of a semi-crystalline polymer, due to elasticity of the crystal part, the H ratio value at this minimum point appears as a value greater than 0.

In other words, the H ratio value at the minimum point is due to the crystalline part of the polymer, and this value may be considered in relation to the degree of crystallinity. In particular, if the H ratio value is expressed after being normalized by the above-described method, the H ratio value at the local minimum point may be derived as the degree of crystallinity value.

FIGS. 6 to 10 show a graph summarizing the measurement results according to a method of measuring a degree of crystallinity of a polymer according to an exemplary embodiment of the present invention.

Referring to FIGS. 6 to 10, when the H ratio passes the local minimum value, the H ratio value 540 at this minimum point may be confirmed.

Further, in FIGS. 6 to 10, the H ratio value in the section where the H ratio value does not change within the temperature range of 20° C. is regarded as 1, and the H ratio value according to each temperature is normalized. It can be seen that the H ratio value at the minimum point is the degree of crystallinity of the target polymer.

In the method of measuring a glass transition temperature of a polymer according to another exemplary embodiment of the present invention, a polymer specimen for measurement is preferably in the form of a sheet. This is for convenience in performing experiments and measurements in the collision test using the collision sphere, and the present invention is not limited thereto.

In addition, a thickness of the polymer specimen may be about 10 nm or more, preferably about 100 nm or more, and according to the above-described measurement principle, the upper limit of the thickness is not significant.

In other words, when the polymer specimen is sufficiently thick, as compared with the collision sphere, there is no great difficulty in the measurement and interpretation of the measurement results. Even though the polymer specimen is thin, there is no great difficulty in the measurement when the material or size of the collision sphere is adjusted. Even though the polymer specimen is too thin, as compared with the collision sphere, accuracy of the measurement may be greatly improved by using a constant temperature chamber. As described above, since the present invention is hardly affected by the thickness of the target polymer specimen, there are advantages in that the range of the object to be measured is very wide, and the method may be directly applied to ultra-thin polymer products produced in the field, as compared with the existing methods of measuring a glass transition temperature, Further, the density of the polymer specimen may be preferably about 0.01 $g/cm^3$ to about 2 $g/cm^3$.

When the density of the polymer specimen is too low, the coefficient of restitution of the polymer specimen becomes too low in performing the collision test, which may cause a problem that the measurement accuracy is deteriorated. When the density is too high, it is difficult to uniformly transmit a temperature or impact to the inside of the polymer specimen, which may cause a problem that the measurement accuracy is deteriorated.

In addition, such a polymer specimen may be used as a measurement object without particular limitation, as long as it is made of a polymer having a glass transition temperature value, and specifically, may include, for example, one or more polymer resins selected from the group consisting of polyolefin-based, polyamide-based, polystyrene-based, polyvinyl-based, polylactide-based, silicone rubber-based, polycarbonate-based, polyacrylonitrile-based, polyacrylic-based, cellulose-based, polyester-based, polyimide-based, polyacetal-based, fluoro-based, polysulfone-based, and polyketone-based polymers, and copolymers thereof.

According to an exemplary embodiment of the present invention, the collision sphere may be preferably a collision sphere in which a ratio of its diameter to the thickness of the polymer specimen is about 1 or more, or about 5 or more, or about 10 to about 100. When the diameter is too small or large, there is a problem in that the measurement error relatively increases. However, since such an error may occur almost the same in the measurement of other temperature ranges, the present invention is not limited thereto.

In this regard, the collision sphere may be any collision sphere, regardless of its material, inorganic materials such as metals or ceramics, organic polymeric materials such as plastics, and glass and ivory, etc., as long as it has a coefficient of restitution of about 0.4 to about 1, specifically, its lower limit is about 0.4 or more, or about 0.5 or more, or about 0.7 or more, and its upper limit is about 1 or less, or less than about 1, or 0.95 or less.

On the other hand, according to still another aspect of the present invention, provided is a device for measuring physical properties of a polymer, the device including a dropping part 100 for dropping a collision sphere; a collision part 200 for generating a collision between the collision sphere and a polymer specimen; and a height-measuring part 300 for measuring a drop height ($H_0$) of the collision sphere and a maximum bounce height ($H_1$) of the collision sphere bounced by a resilience after colliding with the polymer specimen.

Figure 2:
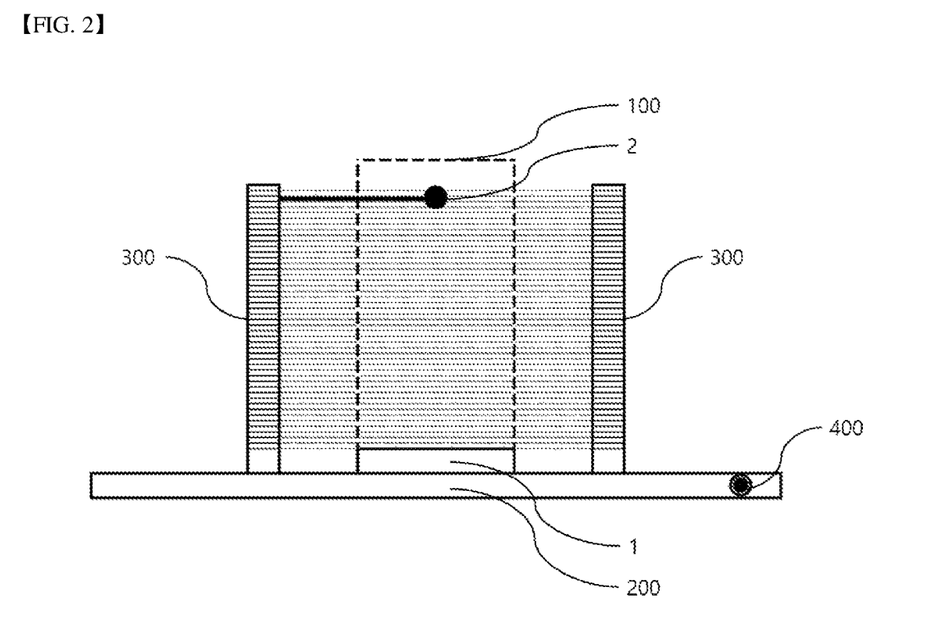
FIG. 2 shows a schematic illustration of a device for measuring physical properties of a polymer according to an exemplary embodiment of the present invention.

FIG. 2 shows a schematic illustration of a device for measuring physical properties of a polymer according to an exemplary embodiment of the present invention.

The dropping part may have a fixing part for fixing the collision sphere before dropping, and may have various shapes within the range that does not interfere with the vertical free fall of the collision sphere.

The collision part is a spot where the collision between the falling collision sphere and the polymer specimen occurs while fixing the polymer specimen. In order to avoid other influences on the performance of the collision experiment and the measurement of the result, the collision part is preferably composed of a material having a coefficient of restitution close to 1.

The height-measuring part may be operated in such a manner that electromagnetic waves such as infrared rays or lasers are emitted and detected.

According to an exemplary embodiment of the present invention, the device for measuring physical properties of a polymer may further include a temperature controller 400 for controlling the temperature of the target polymer specimen.

Such a temperature controller may have a form of including a heating unit or a cooling unit, a temperature control lever, a temperature sensor, etc. The temperature controller may be integrated with the collision part.

The heating unit of the temperature controller may be an electric heating wire type, a water heating type, or an air heating type, and the cooling unit may have a water cooling type, an air cooling type, or a natural cooling type.

Further, the device for measuring physical properties of a polymer according to another exemplary embodiment of the present invention may further include a collision time-measuring part for measuring a collision time between the collision sphere and the polymer specimen.

Such a collision time-measuring part may be configured in a form in which a clock for measuring the time and the above-described height-measuring part are integrated, and the collision time may be estimated through height information of the collision sphere and time information. For example, when a force sensor is used to measure the collision time, changes in the impulse before and after collision of the collision sphere may be obtained, and the applied force may be detected using the sensor, and the collision time may be calculated using an impulse-momentum change equation. However, the present invention is not limited to these specific examples, and other existing tools or devices capable of measuring a collision time of an object may be used without particular limitation.

Meanwhile, the above-described method of measuring a glass transition temperature of a polymer may be performed using the above-described device for measuring physical properties of a polymer.

Advantageous Effects

According to the method of and device for measuring a glass transition temperature of a polymer according to one exemplary embodiment of the present invention, a glass transition temperature may be measured easily, rapidly, and accurately in a field other than a laboratory, and fast and accurate conversion is possible for various measurement conditions such as temperature, frequency, etc.

MODE FOR INVENTION

Hereinafter, the actions and effects of the present invention will be described in more detail with reference to the specific exemplary examples of the present invention. However, these exemplary examples are for illustrative purposes only, and the scope of the present invention is not intended to be limited thereby.

As a polymer resin specimen, polylactic acid (PLA) was prepared in the form of a film with a thickness of 1 mm (amorphous PLA including L-PLA of about 88 wt %~90 wt % and D-PLA of about 10 wt %~12 wt %)

The polylactic acid has a glass transition temperature of about 58.2° C., as measured by a DMA method (frequency: 0.05 Hz).

The polylactic acid specimen was fixed to a collision part, a collision sphere was dropped thereon from a predetermined height ($H_0$), a bounce height ($H_1$) of the collision sphere bounced after colliding with the polymer specimen was measured, and a ratio ($H_1/H_0$) was calculated.

As the collision sphere, a sphere made of non-magnetic stainless steel, with a diameter of 12.7 mm, 6.3 mm, and 3.2 mm, respectively, was used. (SUS304)

The collision experiment was repeated under various temperature conditions from about 20° C. to about 180° C., and the measurement was carried out.

The measurement results are shown in FIG. 3.

FIG. 3 shows a graph summarizing the measurement results according to a method of measuring a glass transition temperature of a polymer according to an exemplary embodiment of the present invention.

By analyzing the graph of FIG. 3, it was determined that a local minimum value of the measured temperature, i.e., a glass transition temperature of the polymer was about 80.5° C.

This difference between the determined value and the glass transition temperature previously obtained is attributed to the difference in the measurement frequency, as described above, and correction was performed by the following method.

First, the collision time in the collision experiment carried out at about 80.5° C. was about $112.5*10^{-6}$ seconds.

The measurement frequency of the present invention calculated therefrom is about 8888 Hz, and thus, $C_f$ value is calculated as −5.25.

$$C_f = \log\frac{f_0}{f_1} \quad \text{[Equation 1]}$$

This value was substituted into Equation 2.

$$T_0 = T + \frac{C_2 C_f}{C_1 + C_f} \quad \text{[Equation 2]}$$

T=80.5° C.; $C_f$=−5.25; $C_1$=17.44; and $C_2$=51.6 were substituted into Equation 2, and as a result, $T_0$ was calculated as about 58.3° C., which seems to be the same value as the known value of 58.2° C. within the error range of measurement and calculation.

Meanwhile, in order to plot the results obtained in the above experiment on a curve and to interpret the results again, the temperature gap was reduced and measurement was performed again.

FIG. 4 shows a graph summarizing the measurement results according to a method of measuring a glass transition temperature of a polymer according to an exemplary embodiment of the present invention.

Referring to FIG. 4, when the H ratio is assumed as a function of temperature through the temperature-H ratio curve, a second-order derivative at each point of the corresponding function may be approximately confirmed.

In addition, through analysis of the graph of FIG. 4, the point (p2) where the second-order derivative has a minimum value was derived, and this point was also confirmed as about 58.2° C., which seems to be the same value as the known value of 58.2° C. within the error range of measurement and calculation.

At this time, the collision experiment was carried out by varying the kind of polymer samples, and the results are shown in FIGS. 5 to 9. The polymer samples used in the experiment are as follows.

PA6: Polyamide 6 (6-Nylon), degree of crystallinity of about 50%;
PMMA: Polymethyl methacrylate, amorphous;
PS: Polystyrene, amorphous;

FIGS. 5 to 10 shows a graph summarizing the measurement results according to a method of measuring a glass transition temperature of a polymer according to an exemplary embodiment of the present invention.

Referring to FIGS. 5 to 10, it can be clearly confirmed that the glass transition temperature and the degree of crystallinity can be accurately derived not only for PLA, but also for other polymeric materials.

Meanwhile, the following reagents were prepared for accurate calculation of the degree of crystallinity.

First reagent: PLA; amorphous PLA including L-PLA of about 88~90 wt % and D-PLA of about 10~12 wt % was used; Example 1

Second reagent: PLLA; crystallizable PLA including L-PLA of about 96~96.5 wt % and D-PLA of about 3.5~4 wt % was used; Example 2

Third reagent: a mixture of PLA and PLLA at a weight ratio of 1:1 was used; Examples 3 to 6

The first and second reagents were used to prepare a polymer resin specimen in the form of a film having a thickness of 1 mm.

The third reagent was used to prepare a polymer resin specimen in the form of a film having a thickness of 0.5 mm.

The specimen was fixed to a collision part, a collision sphere was dropped thereon from a predetermined height ($H_0$), a bounce height ($H_1$) of the collision sphere bounced after colliding with the polylactic acid specimen was measured, and a ratio ($H_1/H_0$) was calculated.

Since PLLA is known to have the maximum crystal formation rate around 115° C., annealing was performed around 95° C. to clearly confirm the difference in the degree of crystallinity according to control of the annealing time by slowing the crystal formation rate.

The first reagent (PLA) was tested immediately without any modification, and the second reagent (PLLA) was left at about 95° C. for about 26 hours and allowed to form crystals, and then the experiment was conducted. The third reagent (PLA:PLLA=1:1) was divided into the following four cases, and the degree of crystallinity was adjusted, and then the experiment was conducted.

Example 3: 1:1 mixture was left at about 95° C. for about 3.3 hours and allowed to form crystals, and then the experiment was conducted.

Example 4: 1:1 mixture was left at about 95° C. for about 6.3 hours and allowed to form crystals, and then the experiment was conducted.

Example 5: 1:1 mixture was left at about 95° C. for about 8 hours and allowed to form crystals, and then the experiment was conducted.

Example 6: 1:1 mixture was left at about 95° C. for about 26 hours and allowed to form crystals, and then the experiment was conducted.

Figure 10:
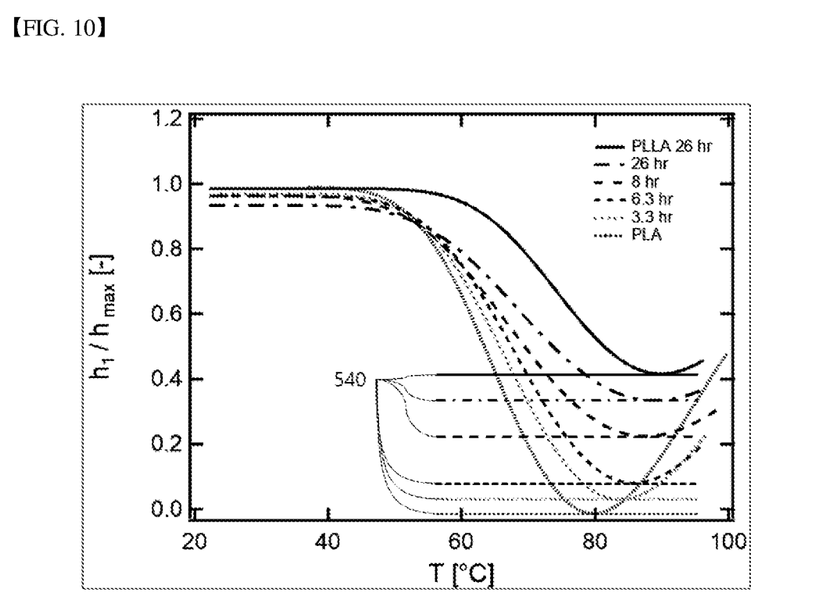

The experimental results are summarized in FIG. 10 and Table 1. In addition, for the same specimen, the comparative data measured by XRD and DSC are summarized in Table 1 below.

TABLE 1

| Note | H ratio value | Temperature at local minimum point | Xc (XRD) [%] | Xc (DSC) [%] |
| --- | --- | --- | --- | --- |
| Example 1 | 0.006 | 76.3 | — | — |
| Example 2 | 0.41 | 89.5 | 38.3 | 35.63 |
| Example 3 | 0.0334 | 81.9 | 3.97 | 4.17 |
| Example 4 | 0.090 | 84.6 | 7.78 | 11.84 |
| Example 5 | 0.23 | 87.4 | 22.83 | 16.79 |
| Example 6 | 0.33 | 89.25 | | |

Referring to FIG. 10 and Table 1, when the degree of crystallinity of the polymer resin was derived by the method according to an exemplary embodiment of the present invention, it was clearly confirmed that it is possible to obtain the substantially same value as in XRD or DSC within the measurement error range.

QUOTATION MARKS

510: First tangent line; 520: Second tangent line; 530: Intersection of first tangent line and second tangent line; 540: Degree of crystallinity.

The invention claimed is:

1. A method of measuring a glass transition temperature of a polymer, the method comprising the steps of:
   A) (a1) colliding a collision sphere with a polymer specimen by dropping the collision sphere onto the polymer specimen from a predetermined drop height ($H_0$);
   (a2) measuring a maximum bounce height ($H_1$) of the collision sphere bounced by a resilience after colliding with the polymer specimen, and calculating a ratio (H ratio, $H_1/H_0$) of the maximum bounce height to the drop height;
   B) measuring the H ratio according to each temperature by repeating the steps of a1 and a2 while varying the temperature; and
   C) work calculating the glass transition temperature from the measured H ratio according to each temperature.

2. The method of claim 1, wherein the step C) includes the step of (c1) examining a temperature (T) at a point where the H ratio has a local minimum value, thereby estimating the temperature T as the glass transition temperature.

3. The method of claim 2, further comprising the step c2 of correcting the T value obtained in (c1).

4. The method of claim 3, wherein in the step c2, the glass transition temperature value is obtained by correcting the T value by a parallel movement model according to the time-temperature superposition principle.

5. The method of claim 3, wherein the step c2 of correcting includes the steps of:
calculating a collision time (s, second) between the collision sphere and the polymer specimen in the step a1;
calculating a collision frequency (f1, Hz) from the collision time (s); and
calculating a correction factor value (Cf) by substituting a frequency (f0, Hz) in a standard method of measuring a glass transition temperature and the above collision frequency (f1) into the following Equation 1:

$$C_f = \log\frac{f_0}{f_1} \quad \text{[Equation 1]}$$

in Equation 1, Cf represents a correction factor value, f0 represents a frequency (Hz) used in a standard method of measuring a glass transition temperature of a polymer, and f1 represents a collision frequency (Hz) obtained from a collision time (s, second) between a collision sphere and a polymer specimen.

6. The method of claim 5, comprising the step of obtaining the glass transition temperature by the following Equation 2:

$$T_0 = T + \frac{C_2 C_f}{C_1 + C_f} \quad \text{[Equation 2]}$$

in Equation 2, T0 represents a glass transition temperature value of a polymer resin to be obtained, T represents a temperature at a point where the H ratio has a local minimum value, Cf represents the correction factor value obtained by Equation 1 of claim 5, and C1 and C2 represent each constant value determined according to the type of the polymer resin.

7. A device for measuring physical properties of a polymer, the device comprising:
a dropping part 100 for dropping a collision sphere;
a collision part 200 for generating a collision between the collision sphere and a polymer specimen;
a collision time-measuring part for measuring the collision time of the collision sphere and the polymer specimen; and
a height-measuring part 300 for measuring a drop height (H0) of the collision sphere and a maximum bounce height (H1) of the collision sphere bounced by a resilience after colliding with the polymer specimen.

8. The method of claim 1, wherein the step C) includes the steps of (c3) obtaining a temperature-H ratio curve from the measurement value; and (c4) examining a temperature at which the H ratio value starts to most rapidly decrease on the temperature-H ratio curve, thereby estimating the temperature as the glass transition temperature.

9. The method of claim 8, wherein the step c4 includes the steps of calculating an instantaneous rate of change (a first rate of change) of the H ratio according to temperature; calculating an instantaneous rate of change (a second rate of change) of the instantaneous rate of change of the H ratio according to temperature; and examining a temperature at which the second rate of change has a minimum value on the temperature-H ratio curve, thereby estimating the temperature as the glass transition temperature.

10. The method of claim 8, wherein the step c4 includes the steps of calculating an instantaneous rate of change (a first rate of change) of the H ratio according to temperature; calculating an instantaneous rate of change (a second rate of change) of the instantaneous rate of change of the H ratio according to temperature; obtaining a tangent line (a first tangent line) in a first temperature range in which the first rate of change is smaller than 0 and the second rate of change is 0 on the temperature-H ratio curve; obtaining a tangent line (a second tangent line) in a second temperature range in which the first rate of change is smaller than 0 and the second rate of change is 0 on the temperature-H ratio curve; and estimating, as the glass transition temperature, a temperature at the intersection of the first tangent line and the second tangent line.

11. The method of claim 8, wherein the device of claim 7 is used.

12. The method of claim 1, wherein the polymer specimen is in the form of a sheet.

13. The method of claim 1, wherein a thickness of the polymer specimen is 10 nm or more.

14. The method of claim 1, wherein a density of the polymer specimen is 0.01 g/cm3 to 2 g/cm3.

15. The method of claim 1, wherein the polymer specimen includes one or more polymer resins selected from the group consisting of polyolefin-based, polyimide-based, polystyrene-based, polyvinyl-based, polylactide-based, silicone rubber-based, polycarbonate-based, polyacrylonitrile-based, polyacrylic-based, cellulose-based, polyester-based, polyimide-based, polyacetal-based, fluorine-based, polysulfone-based, and polyketone-based polymers, and copolymers thereof.

16. The method of claim 1, wherein a ratio of the diameter of the collision sphere to the thickness of the polymer specimen is 1 or more.

17. The method of claim 1, wherein the collision sphere has a coefficient of restitution of 0.4 to 1.

18. The method of claim 2, wherein the device of claim 7 is used.

19. The device of claim 18, further comprising a temperature controller 400 for controlling the temperature of the target polymer specimen.

20. A method of measuring a degree of crystallinity of a polymer, the method comprising the steps of:
A) (a1) colliding a collision sphere with a polymer specimen by dropping the collision sphere onto the polymer specimen from a predetermined drop height (H0);
(a2) measuring a maximum bounce height (H1) of the collision sphere bounced by a resilience after colliding with the polymer specimen, and calculating a ratio (H ratio, H1/H0) of the maximum bounce height to the drop height;
B) measuring the H ratio according to each temperature by repeating the steps of a1 and a2 while varying the temperature; and
C) work calculating a local minimum value from the H ratio measurement value according to each temperature.

* * * * *